United States Patent [19]
Mayer et al.

[11] Patent Number: 5,840,799
[45] Date of Patent: Nov. 24, 1998

[54] MIXER SYSTEM FOR THE PRODUCTION OF WATER-THINNABLE COATING COMPOSITIONS

[75] Inventors: Bernd Mayer, Münster; Uwe Meisenburg, Duisburg; Heinz Peter Rink, Münster, all of Germany

[73] Assignee: BASF Lacke+Farben, AG, Muenster-Hiltrup, Germany

[21] Appl. No.: 406,917

[22] PCT Filed: Sep. 22, 1993

[86] PCT No.: PCT/EP93/02563

§ 371 Date: Apr. 18, 1995

§ 102(e) Date: Apr. 18, 1995

[87] PCT Pub. No.: WO94/07960

PCT Pub. Date: Apr. 14, 1994

[30] Foreign Application Priority Data

Sep. 30, 1992 [DE] Germany .......................... 42 32 721.0

[51] Int. Cl.$^6$ ................... C08J 3/00; C08K 3/20; C08L 75/00; C08L 31/00
[52] U.S. Cl. .................. 524/507; 524/502; 524/533; 524/522; 524/523; 524/558; 524/560; 525/123; 525/127; 525/131; 525/455
[58] Field of Search ..................... 524/502, 507, 524/533, 560, 522, 523, 558; 525/123, 127, 131, 455

[56] References Cited

U.S. PATENT DOCUMENTS 5,168,105 12/1992 Anderson, Jr. et al. ................. 524/441
5,204,401 4/1993 Anderson, Jr. et al. ................. 524/441

FOREIGN PATENT DOCUMENTS 0 052 224 A1 8/1981 European Pat. Off. ........ C09D 17/00
0 121 308 A2 2/1984 European Pat. Off. .......... C09D 7/14
0 311 209 A1 4/1988 European Pat. Off. .......... C09D 7/14

*Primary Examiner*—Patrick D. Niland

[57] ABSTRACT

The present invention relates to a mixer system for the production of water-thinnable coating compositions having a precisely defined color shade, from various base colors, which mixer system is characterized in that it comprises A) various base colors A which contain less than 5% by weight of water, at least one color and/or effect pigment, organic solvent, at least one water-dilutable or water-dispersible acrylic polyurethane resin (A1) and/or polyacrylate resin (A2) and optionally auxiliaries and additives, and B) at least one pigment-free component B which contains water.

The present invention also relates to a process for the production of coating compositions using this mixer system and to the use of the mixer system for the production of aqueous basecoats for the coating of automobile bodies and/or plastic parts, in particular for automotive refinishing.

13 Claims, No Drawings

MIXER SYSTEM FOR THE PRODUCTION OF WATER-THINNABLE COATING COMPOSITIONS

The present invention relates to a mixer system for the production of water-thinnable coating compositions having a precisely defined color shade, from various base colors.

The present invention also relates to a process for the production of these coating compositions having a precisely defined color shade, in which various base colors are stored separately and are mixed only shortly before application to give the coating composition in the desired color.

The present invention also relates to the use of the mixer system for the production of aqueous basecoats for coating automobile bodies and/or plastics parts and for the production of aqueous coating compositions for refinishing.

Conventional methods of repairing damaged areas on a coating which may comprise more than one coat include the careful cleaning and sanding, and possibly surfacing and fillering, of the damaged area. The damaged area is then usually sprayed, if desired after a further pretreatment, in a covering layer, extending into the adjacent regions, with effect coatings, for example metallic basecoats, or with solid-color paints. After initial drying of the coating thus produced, the coating and the adjacent areas are sprayed over with a clearcoat and, after any flashoff time which may be necessary, the clearcoat together with the previously applied coats is dried, preferably at temperatures of between 50° and 100° C.

The effect coatings and/or solid-color paints applied in the two-coat method for the repair of damaged areas are usually low-solids paints which contain, in addition to binders, color and/or effect pigments and a high proportion of organic solvent mixtures.

These paints are either supplied by the paint manufacturer in the desired color, or the color is produced prior to application from a mixer system of two or more base colors. Such production from a mixer system has the advantage that is not necessary to produce and stock each individual color and that it is therefore possible to reduce the costs of production, distribution and stockkeeping. In both cases it is necessary for the paints supplied to have a sufficient storage stability (at least 12 months). In addition, for a mixer system, the color precision of the base colors is of great importance.

Although the production-line finishing sector is increasingly employing water-thinnable basecoats, in the automotive refinishing sector it is still conventional, i.e. solvent-containing, basecoats which are employed. These low-solids basecoats which have been used up to now for refinishing have a composition which is very different from that of the water-thinnable basecoats hitherto used for production-line finishing. Thus, for example, the control of rheology in the conventional systems is predominantly achieved by way of the rate of evaporation of the organic solvents (rise in solids between the application device and the object to be coated), while in the aqueous systems Theological control is achieved using external thickening agents or by corresponding modifications to the binder. Consequently, the changeover from conventional to water-thinnable systems requires more than the mere exchange of the binders used for water-thinnable binders. The use of the water-thinnable systems used in the production-line finishing sector in the sector of refinishing is also not possible at the present time because the different requirements made of the systems in the two sectors. For instance, the water-thinnable metallic basecoats used in production-line finishing (OEM finishing of vehicles) do not have a storage stability which is adequate for the refinishing sector, since problems occur in these water-thinnable paints in relation to the gas stability ($H_2$ formation by reaction of water with the aluminum bronze) and/or effect stability. Both have lasting adverse effects on the color and/or the perceived brightness of the resulting coatings. These systems have consequently not been employed in refinishing.

However it is not only water-thinnable coatings containing effect pigments which give rise to problems with regard to storage stability. Color pigments, too, can be attacked by the prolonged action of water, for example in alkaline medium. So as not to be subject to an excessive restriction in the selection of the commercially available pigments, there is also a need for the formulation of storage-stable base colors containing these color pigments.

On economic grounds, to improve safety at work (fire protection) and to reduce environmental pollution when the coating films dry, attempts are also being made in the refinishing sector to reduce as far as possible the presence of organic solvents in the coating compositions. However, the deficient storage stability of the known water-thinnable basecoats has hitherto prevented the construction of a mixer system as described above using such water-thinnable basecoats.

EP-A-320 552 has disclosed a method for the production of a multilayer coating in which, first of all, an aqueous coating composition preferably containing metallic pigments is applied to the substrate, which has been provided with a filler, and dried before applying a conventional aqueous basecoat and then a clearcoat. The application of the aqueous coating composition prior to the basecoat/clearcoat coating is said to bring about an improvement in the metallic effect, and in particular the perceived brightness.

This method described in EP-A-320 552 is suited primarily to the production of an original finish, but the description also refers to the possibility of employing this method in the refinishing sector.

The aqueous coating composition employed in the method of EP-A-320 552 are [sic] produced by incorporating an aluminum pigment paste into aqueous mixed coatings. The aluminum paste used in this case is a paste of aluminum bronze in organic solvents and an emulsifier. This aluminum paste, however, settles out within only a few hours and thus leads to sediment. This in turn, however, generally leads to off-shades. The pasty sediment can only be reagitated using suitable stirrer devices under limited conditions. Moreover, paintshops do not as a rule have access to stirrer devices of this type. Consequently, such aluminum pastes are not suitable for the construction of mixer systems for refinishing.

Additionally, the aqueous coating compositions obtained after incorporating the aluminum paste into the aqueous mixed coatings are of insufficient storage stability, and do not fulfill the requirements of the paintshop.

Furthermore, EP-A-195 931 and EP-A-297 576 have disclosed aqueous coating compositions for the production of a multilayer coating in the sector of production-line finishing. The production of the aqueous coating compositions is carried out by incorporating a pigment paste into the aqueous binder dispersion. The pigment paste is in this case produced by grinding the corresponding pigments with minimal quantities of a grinding resin and optionally with organic solvents and optionally with water. The construction of a mixer system for the refinishing sector and the measures required to achieve this, for example the separate storage of individual components, are not, however, described in EP-A-195 931 and EP-A-297 576. The pigmented aqueous coating compositions themselves are unsuitable for the refinishing sector on account of their insufficient storage stability.

Aqueous coating compositions for the production of a multilayer coating in the production-line finishing sector are also known from EP-B-38 127. The production of the aqueous coating compositions again takes place by incorporating a pigment paste into the aqueous binder dispersion. The pigment paste in this case is produced by grinding the pigments with a melamine resin and organic solvents. Again, however, the construction of a mixer system for the refinishing sector and the measures required to achieve this are not described. These pigmented aqueous coating compositions of EP-B-38 127, too, are unsuitable for the refinishing sector on account of insufficient storage stability.

EP-A-368 499 describes water-thinnable coating compositions which contain, in particular, metallic pigments and have an improved storage stability. The storage stability is achieved by first preparing a nonaqueous binder solution comprising from 25 to 95% by weight of a polyether- or polyester-polyol, from 2.5 to 50% by weight of an amino resin and from 0 to 50% by weight of an organic solvent, into which the pigments are incorporated. This binder solution is adjusted with water shortly before application to the particular viscosity desired.

EP-A-368 499 does not describe the use of the nonaqueous binder solutions in a mixer system. In addition, the use of the coating compositions of EP-A-368 499 under refinishing conditions is not possible, since the high proportion of polyether/polyester does not lead to films having adequate water-resistance. Furthermore, the metallic effect achieved falls far short of what is required for motor vehicle OEM or refinishing.

Finally, the paper by Hauska and Racz in Farbe and Lack, vol. 93, No. 2, 1987, pages 103 to 105 discloses improving the storage stability of aqueous paint dispersions, inter alia, by producing the aqueous paint dispersions using aluminum pastes which contain, in addition to aluminum pigment, a binder which is miscible with the aluminum pigment and can be diluted with water prior to use. However, the binders which are mentioned in the paper for the production of the aluminum paste are not suitable for use in aqueous coating compositions for the automotive refinishing sector. Accordingly, the paper itself also states that this method is of no industrial significance. Nor does the paper describe the construction of a mixer system and the measures required to achieve this.

The German application P 41 10 520.6, which is as yet unpublished, discloses a mixer system for the production of water-thinnable coating compositions having a defined color shade, from various base colors, in which the mixer system contains largely nonaqueous base colors which are based on water-dilutable or water-dispersible binders, preferably polyurethane resins and amino resins, and also contains a component which is free from pigment and contains water.

The present invention is consequently based on the object of providing a mixer system which enables the production of water-thinnable coating compositions having a precisely defined color shade, from various base colors. The coating compositions produced from the mixer system should have, in particular, a high hiding power. As a particular feature, this mixer system should enable the production of aqueous coating compositions which are suitable for refinishing, in particular of damaged areas on automobile bodies. A high colors precision of the base colors should be ensured, so as to permit the paintshop without laborious measures to match the desired colors in as closely and reproducibly as possible.

This also means that the base colors used for the construction of this mixer system must have a very good storage stability (>12 months). Finally, the aqueous coating compositions produced using this mixer system should lead, with both effect shades and solid-color shades, to coatings having good mechanical properties.

This mixer system should allow the formulation of coating compositions which ensure this high level of quality while at the same time having a content of organic solvents which is reduced in comparison to coating compositions produced conventionally.

This object is achieved, surprisingly, by a mixer system comprising components A and B for the production of water-thinnable coating compositions having a precisely defined color shade, from various base colors, which mixer system is characterized in that it comprises A) various base colors A which contain less than 5% by weight of water, at least one color and/or effect pigment, organic solvent, optionally auxiliaries and additives, and at least one water-dilutable or water-dispersible acrylated polyurethane resin (A1) and/or at least one water-dilutable or water-dispersible polyacrylate resin (A2), and B) at least one pigment-free component B which contains water, the acrylated polyurethane resin (A1) being obtainable by polymerizing, in an organic solvent or in a mixture of organic solvents, Ai) ethylenically unsaturated monomers or a mixture of ethylenically unsaturated monomers in the presence of Aii) a polyurethane resin which has a number-average molecular weight of from 200 to 30,000, preferably from 1000 to 5000, and which statistically contains on average from 0.05 to 1.1, preferably from 0.2 to 0.9 and particularly preferably from 0.3 to 0.7, polymerizable double bonds per molecule, and the polyacrylate resin (A2) being obtainable by adding (I) a mixture of (a1) a (meth)acrylate which is copolymerizable with (a2), (a3), (b1) and (b2) and is essentially free from carboxyl groups, or a mixture of such (meth)acrylates, and optionally (a2) an ethylenically unsaturated monomer which is copolymerizable with (a1), (a3), (b1) and (b2) and which carries at least one hydroxyl group per molecule and is essentially free from carboxyl groups, or a mixture of such monomers, and optionally (a3) an ethylenically unsaturated monomer which is copolymerizable with (a1), (a2), (b1) and (b2) and is essentially free from carboxyl groups, or a mixture of such monomers, to an organic solvent or solvent mixture, and polymerizing the mixture in the presence of at least one polymerization initiator, and (II) after having added at least 80% by weight of the mixture consisting of (a1), optionally (a2) and optionally (a3), adding thereto (b1) from 60–100% by weight of an ethylenically unsaturated monomer which is copolymerizable with (a1), (a2) and (a3) and carries at least one carboxyl group per molecule, or of a mixture of such monomers, together with (b2) from 0 to 40% by weight of an ethylenically unsaturated monomer which is copolymerizable with (a1), (a2), (a3) and (b1) and is free from carboxyl groups, or of a mixture of such monomers, and continuing polymerization, the sum of the proportions by weight of (b1) and (b2) always being 100% by weight and (a1), (a2), (a3), (b1) and (b2) being chosen in terms of their nature and quantity such that the polyacrylate resin has a hydroxyl number of from 0 to <40, preferably from 5 to 35, an acid number of from 20 to 100, preferably from 25 to 50, and a glass transition temperature ($T_G$) of from −40° C. to +60° C., preferably from −20° C. to +40° C.

The present invention also relates to a process for the production of water-thinnable coating compositions having a precisely defined color shade, in which various base colors of a mixer system are produced and stored separately and are mixed only shortly before the application of the coating composition, characterized in that the mixer system according to the invention is employed.

Finally, the present invention also relates to the use of the mixer systems for the production of aqueous coating compositions for refinishing, in particular for the production of aqueous basecoats for the refinishing, in particular, of automobile bodies.

It is surprising, and was not foreseeable, that the mixer system according to the invention enables the production of aqueous coating compositions which are distinguished by a precise and reproducible formulation of the desired color, without laborious measures being necessary to achieve this. This is ensured by a high color precision and a correspondingly good storage stability of the base colors. A further advantage is to be seen in the fact that the base colors produced in accordance with the invention are not sensitive to freezing/thawing. In addition, the aqueous coating compositions produced in this way have the advantage that they lead to coatings having good mechanical properties.

A further advantage is that the mixer system according to the invention provides coating compositions, in the refinishing sector, too, which meet the high requirements with regard to the quality of the refinish and which additionally contain predominantly water as solvent, and contain only small residual amounts of organic solvents. In addition to the economic advantages, this reduced solvent content leads to an improvement in safety at work (fire protection) and to a reduction in environmental pollution when the coating films dry. This is significant in the sector of refinishing automobile bodies in particular, since the effect coatings employed in this sector usually contain a very high solvent content of up to 90%, so as to ensure a good metallic effect.

The use according to the invention of essentially non-aqueous and preferably completely water-free base colors offers the additional advantage that the containers which can be used for storing these base colors need not be protected (e.g. by a corresponding internal coating) against corrosion by water. In addition, under certain circumstances even water-sensitive pigments can be employed for formulating the base colors, which represents a considerable widening of the choice of pigments which can be employed.

The individual components of the mixer system according to the invention will now be discussed in more detail below.

Component A of the mixer system may contain any pigments which are conventional in coatings, provided that they do not react with water within a short period (time between the stirring together of components A and B and the application of the paints) and that they do not dissolve in water. Component A can then contain effect pigments and/or color pigments based on inorganic or organic substances. In order to ensure a substantially universal scope of application and to enable the production of as many colors as possible, it is preferred to construct a mixer system based on components A which contain only color pigments and components A which contain only effect pigments.

The effect pigments which can be used in the production of component A are all those usually employed in the formulation of aqueous coating compositions. Examples of suitable effect pigments are commercial aluminum bronzes, the aluminum bronzes chromated as in DE-A-3636183, commercial stainless steel bronzes and other conventional metal flakes and metal flake pigments. Non metallic effect pigments are also suitable for the production of component A, for example pearlescent or interference pigments.

Examples of suitable color pigments based on inorganic substances are titanium dioxide, iron oxides, carbon black and the like. Examples of suitable color pigments based on organic substances are Indanthrene Blue, is Cromophthal Red, Irgazine Orange, Sicotrans Yellow, Heliogen Green and the like.

Suitable binders for use in component A are the water-dilutable and/or water-dispersible acrylated polyurethanes and polyacrylates which have already been mentioned and which are usually employed in aqueous coating compositions and which can be prepared in the form of organic solutions. The water-dilutability or water-dispersibility of the resins can also be adjusted by using corresponding solubilizers as cosolvent or solvent. The decisive factors for the selection of the binders are, on the one hand, their good storage stability in organic solution, and in particular the ability to prevent settling of the pigments, and, on the other hand, ease of incorporating the base color into component B or component B into the base color. It is true that easy incorporation of the base color into component B or vice versa can, of course, also be achieved by the use of dispersing additives, for example ionic or nonionic surfactants. However, such additives should be used sparingly, so as not to impair the stability of the resulting coatings to water.

The acrylated polyurethane resins (A1) employed as binders in the base colors are known in principle.

Acrylated polyurethanes (A1) of this type which are used as binders in component A of the mixer system according to the invention, and their preparation, are described in DE-A-40 10 176.

In the preparation of these acrylated polyurethanes (A1), a first step involves the preparation of a polyurethane resin (Aii) by well-known methods of polyurethane chemistry. The polyurethane resin is prepared from the following components:

(Aiia) a polyester- and/or polyether-polyol having a number-average molecular weight of from 400 to 5,000, or a mixture of such polyester- and/or polyether-polyols, (Aiib) a polyisocyanate or mixture of polyisocyanates, (Aiic) optionally a compound which contains in addition to a polymerizable double bond at least one other group which is reactive towards NCO groups, or a mixture of such compounds, (Aiid) optionally a compound whose molecule contains at least one group which is reactive towards isocyanate groups and at least one group which is capable of anion formation, or a mixture of such compounds, (Aiie) optionally a compound whose molecule contains at least one group which is reactive towards NCO groups and at least one poly(oxyalkylene) group, or a mixture of such compounds, and optionally (Aiif) an organic compound containing hydroxyl and/or amino groups and having a molecular weight of from 60 to 600, or a mixture of such compounds.

The polyurethane resin (Aii) should have a number-average molecular weight of from 200 to 30,000, preferably from 1,000 to 5,000, and should statistically contain, on average, from 0.05 to 1.1, preferably from 0.2 to 0.9 and particularly preferably from 0.3 to 0.7, polymerizable double bonds per molecule. It is preferred for the polyurethane resin (Aii) to have an acid number of from 0 to 90 mg of KOH/g. The molecular weight of the polyurethane resins can—as is known to those skilled in the art—be regulated in particular by the quantity ratio and the functionality of the starting compounds (Aiia) to (Aiif) which are employed.

The polyurethane resins can be prepared both without solvent and in organic solvents.

The polyurethane resins can be prepared by the simultaneous reaction of all the starting compounds. In many cases, however, it is expedient for the polyurethane resins to be prepared in stages. For example, it is possible to prepare an isocyanate group-containing prepolymer from components (Aiia) and (Aiib) which is then further reacted with component (Aiic). It is also possible to prepare an isocyanate group-containing prepolymer from components (Aiia), (Aiib), (Aiic) and optionally (Aiid) and (Aiie) which can then be reacted with component (Aiif) to give higher molecular weight polyurethanes. In cases where the compound employed as component (Aiic) contains only one group which is reactive towards isocyanate groups, an isocyanate group-containing precursor can be prepared in a first stage from (Aiib) and (Aiic) which can then be further reacted with the other components.

The reaction of components (Aiia) to (Aiif) is preferably, advantageously carried out in the presence of catalysts, for example dibutyltin dilaurate, dibutyltin maleate, tertiary amines, etc.

The amounts of component (Aiia), (Aiib), (Aiic), (Aiid), (Aiie) and (Aiif) to be employed depend on the number-average molecular weight and acid number to be achieved. The polymerizable double bonds can be incorporated into the polyurethane molecules by using (Aiia) components containing polymerizable double bonds and/or component (Aiic). It is preferred to incorporate the polymerizable double bonds by means of component (Aiic).

As component (Aiia) it is possible to employ saturated and unsaturated polyester- and/or polyether-polyols, in particular polyester- and polyether-diols having a number-average molecular weight of from 400 to 5,000. Examples of suitable polyether-diols are the polyether-diols of the general formula $H(-O-(CHR^1)_n-)_mOH$, in which $R^1$=hydrogen or a lower, optionally substituted alkyl radical, n=2 to 6, preferably from 3 to 4, and m=2 to 100, preferably from 5 to 50. Examples are linear or branched polyether-diols such as poly(oxyethylene) glycols, poly(oxypropylene) glycols and poly(oxybutylene) glycols.

The polyether-diols chosen should not introduce excessive amounts of ether groups, since otherwise the polymers formed will swell in water. The preferred polyether-diols are poly(oxypropylene) glycols from within the range of molecular masses $M_n$ of from 400 to 3,000.

Polyester-diols are prepared by esterification of organic dicarboxylic acids or their anhydrides with organic diols, or are derived from a hydroxycarboxylic acid or a lactone. To prepare branched polyester-polyols, a small proportion of polyols or polycarboxylic acids having a higher functionality can be employed. The dicarboxylic acids and diols may be linear or branched aliphatic, cycloaliphatic or aromatic dicarboxylic acids or diols.

The diols used to prepare the polyesters comprise, for example, alkylene glycols such as ethylene glycol, propylene glycol, butylene glycol, butane-1,4-diol, hexane-1,6-diol and neopentylglycol and other diols such as dimethylolcyclohexane. However, small amounts of polyols such as trimethylolpropane, glycerol and pentaerythritol can also be added. The acid component of the polyester primarily comprises low molecular weight dicarboxylic acids or their anhydrides having from 2 to 44, preferably from 4 to 36, carbon atoms in the molecule. Examples of suitable acids are o-phthalic acid, isophthalic acid, terephthalic acid, tetrahydrophthalic acid, cyclohexanedicarboxylic acid, succinic acid, adipic acid, azelaic acid, sebacic acid, maleic acid, fumaric acid, glutaric acid, hexachloroheptanedicarboxylic acid, tetrachlorophthalic acid and/or dimerized fatty acids. Instead of these acids it is also possible to use their anhydrides, provided they exist. In the formation of polyester-polyols it is also possible for minor amounts of carboxylic acids having 3 or more carboxyl groups to be present, for example trimellitic anhydride or the adduct of maleic anhydride with unsaturated fatty acids.

Polyester-diols can also be employed which are obtained by reacting a lactone with a diol. Their characteristic feature is the presence of terminal hydroxyl groups and recurring polyester units of the formula $(-CO-(CHR^2)_n-CH_2-O)$. n, here, is preferably from 4 to 6 and the substituent $R^2$=hydrogen or an alkyl, cycloalkyl or alkoxy radical. No substituent contains more than 12 carbon atoms. The total number of carbon atoms in the substituent does not exceed 12 per lactone ring. Examples of such compounds are hydroxycaproic acid, hydroxybutyric acid, hydroxydecanoic acid and/or hydroxy-stearic acid.

In the preparation of the polyester-diols, the unsubstituted $\epsilon$-caprolactone is preferred, in which n is 4 and all the substituents $R^2$ are hydrogen. The reaction with lactone is initiated by low molecular weight polyols such as ethylene glycol, 1,3-propanediol, 1,4-butanediol, and dimethylolcyclohexane. However, it is also possible to react caprolactone with other reaction components, such as ethylene diamine, alkyldialkanolamines or, alternatively, urea. Suitable higher molecular weight diols also include polylactam-diols, which are prepared by the reaction of, for example, $\epsilon$-caprolactam with low molecular weight diols.

If polymerizable double bonds are to be incorporated into the polyurethane molecules via component (Aiia), then (Aiia) components must be employed which contain polymerizable double bonds. Examples of such (Aiia) components are polyester-polyols, preferably polyester-diols, which have been prepared using polyols and/or polycarboxylic acids containing polymerizable double bonds. Examples of polyols containing polymerizable double bonds are trimethylolpropane monoallyl ether, glycerol monoallyl ether, pentaerythritol mono- and pentaerythritol diallyl ether. Examples of polycarboxylic acids containing polymerizable double bonds are alkenedicarboxylic acids, maleic acid and unsaturated dimerized fatty acids.

As component (Aiib) it is possible to employ aliphatic and/or cycloaliphatic and/or aromatic polyisocyanates. Examples of aromatic polyisocyanates are phenylene diisocyanate, toluylene diisocyanate, xylylene diisocyanate, biphenylene diisocyanate, naphthylene diisocyanate and diphenylmethane diisocyanate.

Because of their good resistance towards ultraviolet light, (cyclo)aliphatic polyisocyanates give products having a low tendency to yellowing. Examples of cycloaliphatic polyisocyanates are isophorone diisocyanate, cyclopentylene diisocyanate and the hydrogenation products of aromatic diisocyanates, such as cyclohexylene diisocyanate, methylcyclohexylene diisocyanate and dicyclohexylmethane diisocyanate. Aliphatic diisocyanates are compounds of the formula

in which r is an integer from 2 to 20, in particular from 6 to 8, and $R^3$, each of which may be identical or different, represents hydrogen or a lower alkyl radical having from 1 to 8 C atoms, preferably 1 or 2 C atoms. Examples of these are trimethylene diisocyanate, tetramethylene diisocyanate, pentamethylene diisocyanate, hexamethylene diisocyanate, propylene diisocyanate, ethylethylene diisocyanate, dimethylethyl diisocyanate, methyltrimethylene diisocyanate and trimethylhexane diisocyanate. A further example of an aliphatic diisocyanate is tetramethylxylene diisocyanate. Isophorone diisocyanate and dicyclohexylmethane diisocyanate are particularly preferred as diisocyanates.

Having regard to the functionality of the polyisocyanates, component (Aiib) must have a composition such that a crosslinked polyurethane resin is not obtained. Component (Aiib) may also contain, in addition to diisocyanates, a proportion of polyisocyanates with functionalities greater than two, for example triisocyanates.

Suitable triisocyanates are products which are formed by the trimerization or oligomerization of diisocyanates or by the reaction of diisocyanates with polyfunctional compounds containing OH or NH groups. Examples include the biuret of hexamethylene diisocyanate and water, the isocyanurate of hexamethylene diisocyanate, or the adduct of isophorone diisocyanate with trimethylolpropane. The average functionality can if desired be lowered by adding monoisocyanates. Examples of such chain-terminating monoisocyanates are phenyl isocyanate, cyclohexyl isocyanate and stearyl isocyanate.

Component (Aiic) is used to incorporate polymerizable double bonds into the polyurethane resin molecules. It is preferred to employ as component (Aiic) a compound which contains at least two groups which are reactive towards NCO groups, and one polymerizable double bond. Compounds which it is particularly preferred to employ as component (Aiic) are those also containing, in addition to a polymerizable double bond, two groups which are reactive towards NCO groups. Examples of groups which are reactive towards NCO groups are —OH, —SH, >NH and —NH$_2$ groups, with —OH, >NH and —NH$_2$ groups being preferred. Examples of compounds which can be employed as component (Aiic) are: hydroxy (meth)acrylates, in particular hydroxyalkyl(meth)acrylates such as hydroxyethyl, hydroxypropyl, hydroxybutyl or hydroxyhexyl-(meth)acrylate and 2,3-dihydroxypropyl(meth)acrylate, 2,3-dihydroxypropyl monoallyl ether, allyl 2,3-dihydroxypropanoate, glycerol mono(meth)acrylate, glycerol monoallyl ether, pentaerythritol mono(meth)acrylate, pentaerythritol di(meth)acrylate, pentaerythritol monoallyl ether, pentaerythritol diallyl ether, trimethylolpropane monoallyl ether, trimethylpropane mono(meth)acrylate and trimethylolpropane diallyl ether. As component (Aiic) it is preferred to employ trimethylolpropane monoallyl ether, glycerol mono(meth)acrylate, pentaerythritol di(meth)acrylate, pentaerythritol diallyl ether, glycerol monoallyl ether and trimethylolpropane mono(meth)acrylate. It is particularly preferred to employ as component (Aiic) trimethylolpropane monoallyl ether and glycerol monoallyl ether. It is preferred to incorporate (Aiic) components which contain at least two groups which are reactive towards NCO groups into the polyurethane molecules in chain positions (not terminally).

The introduction into the polyurethane molecules of groups which are capable of anion formation is effected by the incorporation of compounds (Aiid) into the polyurethane molecules, which contain at least one group which is reactive towards isocyanate groups and one group which is capable of anion formation in the molecule.

The amount of component (Aiid) to be employed can be calculated from the desired acid number.

As component (Aiid) it is preferred to employ compounds whose molecule contains two groups which are reactive towards isocyanate groups. Suitable groups which are reactive towards isocyanate groups are in particular hydroxyl groups, and also primary and/or secondary amino groups. Suitable groups capable of anion formation are carboxyl, sulfonic acid and/or phosphonic acid groups, with carboxyl groups being preferred. Examples of component (Aiid) which can be employed are alkanoic acids having two substituents on the α carbon atom. The substituent may be a hydroxyl group, an alkyl group or, preferably, an alkylol group. These alkanoic acids have at least one and in general from 1 to 3 carboxyl groups in the molecule. They have from two to about 25, preferably from 3 to 10, carbon atoms. Examples of component (Aiid) are dihydroxypropionic acid, dihydroxysuccinic acid and dihydroxybenzoic acid. A particularly preferred group of alkanoic acids are the α,α-dimethylolalkanoic acids of the general formula $R^4$—C(CH$_2$OH)$_2$COOH, in which $R^4$ represents a hydrogen atom or an alkyl group having up to 20 carbon atoms.

Examples of such compounds are 2,2-dimethylolacetic acid, 2,2-dimethylolpropionic acid, 2,2-dimethylolbutyric acid and 2,2-dimethylolpentanoic acid. The preferred dihydroxyalkanoic acid is 2,2-dimethylolpropionic acid. Examples of compounds containing amino groups are αδ-diaminovaleric acid, 3,4-diaminobenzoic acid, 2,4-diaminotoluenesulfonic acid and 2,4-diamino diphenyl sulfonic acid. Using component (Aiie), poly(oxyalkylene) groups can be introduced into the polyurethane molecules as nonionic stabilizing groups. Examples of component (Aiie) which can be employed are alkoxypoly(oxyalkylene) alcohols of the general formula R'O—(—CH$_2$—CHR"—O—)$_n$H, in which R' is an alkyl radical having from 1 to 6 carbon atoms, R" is a hydrogen atom or an alkyl radical having from 1 to 6 carbon atoms, and n is a number between 20 and 75.

The use of component (Aiif) leads to a rise in the molecular weight of the polyurethane resins. Examples of component (Aiif) which can be employed are polyols having up to 36 carbon atoms per molecule, such as ethylene glycol. Diethylene glycol, triethylene glycol, 1,2-propanediol, 1,3-propanediol, 1,4-butanediol, 1,2-butylene glycol, 1,6-hexanediol, trimethylolpropane, castor oil or hydrogenated castor oil, ditrimethylolpropane ether, pentaerythritol, 1,2-cyclohexanediol, 1,4-cyclohexanedimethanol, bisphenol A, bisphenol F, neopentylglycol, neopentylglycol hydroxypivalate, hydroxyethylated or hydroxypropylated bisphenol A, hydrogenated bisphenol A and mixtures thereof. The polyols are generally employed in quantities of up to 30 percent by weight, preferably from 2 to 20 percent by weight, based on the amount of component (Aiia) and (Aiif) employed.

As component (Aiif) it is also possible to employ di- and/or polyamines having primary and/or secondary amino groups. Polyamines are essentially alkylene-polyamines having from 1 to 40 carbon atoms and preferably from about 2 to 15 carbon atoms. They can carry substituents which do not have hydrogen atoms which are reactive with isocyanate groups. Examples are polyamines of linear or branched aliphatic, cycloaliphatic or aromatic structure having at least two primary amino groups. Diamines which can be mentioned are hydrazine, ethylenediamine, propylenediamine, 1,4-butylenediamine, piperazine, 1,4-cyclohexyldimethylamine, hexamethylene-1,6-diamine, trimethylhexamethylenediamine, menthane-diamine, isophoronediamine, 4,4'-diaminodicyclohexyl-methane and aminoethylethanolamine. Preferred diamines are hydrazine, alkyl- or cycloalkyldiamines such as propylenediamine and 1-amino-3-aminomethyl-3,5,5-trimethylcyclohexane. Polyamines containing more than two amino groups in the molecule can also be employed as component (Aiif). In such cases, however, it must be ensured—for example by using monoamines as well—that crosslinked polyurethane resins are not obtained. Polyamines of this type which can be used are diethylenetriamine, triethylenetetramine, dipropylenediamine and dibutylenetriamine. An example of a monoamine is ethylhexylamine.

The acrylated polyurethane resins are prepared by dissolving the polyurethane resin (Aii) in an organic solvent or mixture of. organic solvents and, in this solution, polymerizing ethylenically unsaturated monomers or a mixture of ethylenically unsaturated monomers by free-radical polymerization, and converting the reaction product thus obtained into an aqueous dispersion. It is preferred to employ water-miscible organic solvents. Examples of solvents which can be used are butylglycol, 2-methoxypropanol, n-butanol, methoxybutanol, n-propanol, ethylene glycol monomethyl ether, ethylene glycol monoethyl ether, ethylene glycol monobutyl ether, diethylene glycol monomethyl ether, diethylene glycol monoethyl ether, diethylene glycol diethyl ether, diethylene glycol monobutyl ether and 3-methyl-3-methoxybutanol or mixtures of these solvents.

Ketones are preferred, for example acetone, methyl ethyl ketone, diethyl ketone and methyl isobutyl ketone.

The free-radical polymerization is carried out at temperatures of from 80° to 1600° C., preferably from 120° to 160° C., in the abovementioned organic solvents or solvent mixtures.

Examples of polymerization initiators which can be used are initiators which form free radicals, such as benzoyl peroxide, azobisisobutyronitrile and t-butyl perbenzoate.

During the polymerization, graft reactions also occur between the polyurethane resin (Aii) and component (Ai).

Components (Ai) and (Aii) are employed in a ratio by weight of from 1:10 to 10:1, preferably from 1:2 to 2:1 and particularly preferably 1:1.

The ethylenically unsaturated monomers which can be employed are practically all those monomers which can be polymerized by free-radical mechanisms, although the usual restrictions on copolymerizations apply, as prescribed by the Q and e scheme according to Alfrey and Price and by the copolymerization parameters (cf. e.g. Brandrup and Immergut, Polymer Handbook, 2nd Ed. John Wiley + Sons, New York (1975)).

Ethylenically unsaturated monomers which can be employed are:
(i) aliphatic or cycloaliphatic esters of acrylic acid or methacrylic acid, or a mixture of such esters, and
(ii) ethylenically unsaturated monomers carrying at least one hydroxyl group in the molecule, or a mixture of such monomers, and
(iii) ethylenically unsaturated monomers carrying at least one carboxyl group in the molecule, or a mixture of such monomers, and
(iv) other ethylenically unsaturated monomers which are different from (i), (ii) and (iii), or a mixture of such monomers, and
(v) polyunsaturated monomers, in particular ethylenically polyunsaturated monomers.

The abovementioned monomers are preferably employed as mixtures, with component (i) being employed in an amount of from 40 to 100, preferably from 60 to 90, % by weight, component (ii) being employed in an amount of from 0 to 20, preferably from 3 to 12, % by weight, component (iii) being employed in an amount of from 0 to 30, preferably from 5 to 15, % by weight, component (iv) being employed in an amount of from 0 to 30, preferably from 0 to 10, % by weight and component (v) being employed in an amount of from 0 to 5, preferably 0, % by weight, and the sum of the proportions by weight of (i), (ii), (iii), (iv) and (v) always being 100% by weight.

Examples of component (i) which can be employed are: cyclohexyl acrylate, cyclohexyl methacrylate, alkyl acrylates and alkyl methacrylates having up to 20 carbon atoms in the alkyl radical, for example methyl, ethyl, propyl, butyl, hexyl, ethylhexyl, stearyl and lauryl acrylate and methacrylate or mixtures of these monomers.

Examples of component (ii) which can be employed are: hydroxyalkyl esters of acrylic acid, methacrylic acid or of another $\alpha,\beta$-ethylenically unsaturated carboxylic acid. These esters may be derived from an alkylene glycol which is esterified with the acid, or they can be obtained by reacting the acid with an alkylene oxide. As component (ii) it is preferred to employ hydroxyalkyl esters of acrylic acid and methacrylic acid in which the hydroxyalkyl group contains up to 4 carbon atoms, or mixtures of these hydroxyalkyl esters. Examples of such hydroxyalkyl esters are 2-hydroxyethyl acrylate, 2-hydroxypropyl acrylate, 2-hydroxypropyl methacrylate, 3-hydroxypropyl acrylate, 3-hydroxypropyl methacrylate, 2-hydroxyethyl methacrylate, 3-hydroxybutyl acrylate or 4-hydroxybutyl (meth)acrylate. Corresponding esters of other unsaturated acids, for example ethacrylic acid, crotonic acid and similar acids having up to about 6 carbon atoms per molecule, can also be employed.

As component (iii) it is preferred to employ acrylic acid and/or methacrylic acid. However, it is also possible to employ other ethylenically unsaturated acids having up to 6 carbon atoms in the molecule. Examples of such acids are ethacrylic acid, crotonic acid, maleic acid, fumaric acid and itaconic acid.

Examples of component (iv) which can be employed are: aromatic vinyl hydrocarbons, such as styrene, $\alpha$-alkylstyrene and vinyltoluene, acrylamide and methacrylamide, and acrylonitrile and methacrylonitrile, or mixtures of these monomers.

As components (v) it is possible to employ compounds which contain at least two double bonds in the molecule which can be polymerized by free radical mechanisms. Examples are: divinylbenzene, p-methyldivinylbenzene, o-nonyldivinylbenzene, ethanediol di(meth)acrylate, 1,4 butanediol di(meth) acrylate, 1,6-hexanediol di(meth) acrylate, trimethylolpropane tri(meth)acrylate, pentaerythritol di(meth)acrylate, allyl methacrylate, diallyl phthalate, butanediol divinyl ether, divinylethyleneurea, divinylpropyleneurea, diallyl maleate, etc.

The use of difunctional unsaturated monomers such as butanediol diacrylate or hexanediol diacrylate is preferred. When using glycidyl methacrylate and methacrylic acid the corresponding glycerol dimethacrylate is formed automatically during the polymerization. The nature and quantity of polyunsaturated monomers should be closely tailored to the reaction conditions (catalysts, reaction temperature, solvents) so as not to obtain any gelation. The amount of polyunsaturated monomers added serves to increase the average molecular mass without the formation of gels. However, it is preferred not to add any polyunsaturated monomer.

The polymers employed in accordance with the invention and prepared from (Ai) and (Aii) must contain groups capable of anion formation, which are neutralized prior to or during the transfer of the polymers from the organic solvent or solvent mixture to water and enable the formation of stable aqueous dispersions. The polymers under discussion can also contain, in addition to the groups capable of anion formation, other nonionic stabilizing groups, for example poly(oxyalkylene) groups, in particular poly(oxyethylene) and/or poly(oxypropylene) and/or poly(oxyethylene) (oxypropylene) groups.

The quantity of groups capable of anion formation, which are contained in the polymers employed in accordance with the invention and prepared from (Ai) and (Aii), should be high enough for the polymers to have an acid number of from 5 to 200, preferably from 10 to 40 and particularly preferably from 15 to 30. The introduction of the groups capable of anion formation into the polymers under discussion can be carried out, for example, by way of components (Aiid) and (iii). The groups capable of anion formation can be contained exclusively in component (Ai) or exclusively in component (Aii) or both in component (Ai) and in component (Aii). It is preferred for from 50 to 100%, preferably from 70 to 100% and particularly preferably 100% of the groups capable of anion formation to be contained in component (Ai).

The introduction of poly(oxyalkylene) groups into the polymers can be effected by way of component (Aiie) or by way of ethylenically unsaturated monomers which contain at least one poly(oxyalkylene) group (e.g. poly(oxyethylene) (meth)acrylates). The polymers should not contain excessive amounts of poly(oxyalkylene) groups, since otherwise the moisture resistance of the coating films may be lowered. The content of poly(oxyalkylene) groups can be from 1 to 10% by weight, preferably from 1 to 5% by weight (based on the weight of the polymer prepared from (Ai) and (Aii)). The polymers which are employed in accordance with the invention and prepared from (Ai) and (Aii) should preferably contain no nonionic stabilizing groups.

The polymers prepared from (Ai) and (Aii) should preferably have a hydroxyl number of from 0 to 100 and particularly preferably from 20 to 80. The number-average molecular weight of the polymers should preferably be from 2,000 to 20,000 and particularly preferably from 5,000 to 12,000.

Particularly preferred polymers are the polymers prepared from (Ai) and (Aii) which have a polydispersity index Q of from 5 to 90 and preferably from 10 to 30. The polydispersity index is the quotient $M_w : M_n$, where $M_w$ represents the weight-average and $M_n$ represents the number-average molecular weight.

Also suitable as the water-soluble or water-dispersible binder component of the base color A of the mixer system according to the invention are water-dilutable or water-dispersible polyacrylate resins which can be obtained by adding (I) a mixture of
  (a1) a (meth)acrylate which is copolymerizable with (a2), (a3), (b1) and (b2) and is essentially free from carboxyl groups, or a mixture of such (meth)acrylates, and optionally
  (a2) an ethylenically unsaturated monomer which is copolymerizable with (a1), (a3), (b1) and (b2) and which carries at least one hydroxyl group per molecule and is essentially free from carboxyl groups, or a mixture of such monomers, and optionally
  (a3) an ethylenically unsaturated monomer which is copolymerizable with (a1), (a2), (b1) and (b2) and is essentially free from carboxyl groups, or a mixture of such monomers, to an organic solvent or solvent mixture, and polymerizing the mixture in the presence of at least one polymerization initiator, and (II) after having added at least 80% by weight of the mixture consisting of (a1), optionally (a2) and optionally (a3), adding thereto
  (b1) from 60–100% by weight of an ethylenically unsaturated monomer which is copolymerizable with (a1), (a2) and (a3) and carries at least one carboxyl group per molecule, or of a mixture of such monomers, together with
  (b2) from 0 to 40% by weight of an ethylenically unsaturated monomer which is copolymerizable with (a1), (a2), (a3) and (b1) and is free from carboxyl groups, or of a mixture of such monomers, and continuing polymerization, the sum of the proportions by weight of (b1) and (b2) always being 100% by weight and (a1), (a2), (a3), (b1) and (b2) being chosen in terms of their nature and quantity such that the polyacrylate resin has a hydroxyl number of from 0 to <40, preferably from 5 to 35, an acid number of from 20 to 100, preferably from 25 to 50, and a glass transition temperature ($T_G$) of from −40° C. to +60° C., preferably from −20° C. to +40° C.

The expression "essentially-free from carboxyl groups" is intended to express the fact that components (a1), (a2) and (a3) can have a small content of carboxyl groups (but not more than that required for a polyacrylate resin prepared from components (a1), (a2) and (a3) to have an acid number of 10 at most). However, it is preferred for the carboxyl-group content of components (a1), (a2) and (a3) to be kept as low as possible. It is particularly preferred to employ (a1), (a2) and (a3) components which are free from carboxyl groups.

For the preparation of the polyacrylate resins (A2) which are to be employed in accordance with the invention, the component (a1) employed can be any ester of (meth)acrylic acid which is copolymerizable with (a2), (a3), (b1) and (b2) and is essentially free from carboxyl groups, or a mixture of such (meth)acrylates. Examples are alkyl acrylates and alkyl methacrylates having up to 20 carbon atoms in the alkyl radical, for example methyl, ethyl, propyl, butyl, hexyl, ethylhexyl, stearyl and lauryl acrylate and methacrylate and cycloaliphatic (meth)acrylates, for example cyclohexyl (meth)acrylate. It is preferred to employ mixtures of alkyl acrylates and/or alkyl methacrylates as (a1) component which are composed of up to 25% by weight of n-butyl and/or t-butyl acrylate and/or n-butyl and/or t-butyl methacrylate.

As component (a2) it is possible to employ any ethylenically unsaturated monomers which are copolymerizable with (a1), (a3), (b1) and (b2) and which carry at least one hydroxyl group per molecule and are essentially free from carboxyl groups, or a mixture of such monomers. Examples are hydroxylalkyl (sic) esters of acrylic acid, methacrylic acid or another α,β-ethylenically unsaturated carboxylic acid. These esters can be derived from an alkylene glycol which is esterified with the acid, or they can be obtained by reacting the acid with an alkylene oxide. The hydroxyalkyl esters which it is preferred to employ as component (a2) are those of acrylic acid and methacrylic acid in which the hydroxyalkyl group contains up to 4 carbon atoms, reaction products of cyclic esters, for example ε-caprolactone and these hydroxyalkyl esters, or mixtures of these hydroxyalkyl esters and/or ε-caprolactone-modified hydroxyalkyl esters. Examples of such hydroxyalkyl esters are 2-hydroxyethyl acrylate, 2-hydroxypropyl acrylate, 3-hydroxypropyl acrylate, 2-hydroxypropyl methacrylate, 3-hydroxypropyl methacrylate, 2-hydroxyethyl methacrylate, 4-hydroxybutyl acrylate and 4-hydroxybutyl methacrylate. Corresponding esters of other unsaturated acids, for example ethacrylic acid, crotonic acid and similar acids having up to about 6 carbon atoms per molecule, can also be employed.

As component (a3) it is possible to employ all ethylenically unsaturated monomers which are copolymerizable with (a1), (a2), (b1) and (b2) and are essentially free from carboxyl groups, or mixtures of such monomers. The compounds preferably employed as component (a3) are aromatic vinyl hydrocarbons, such as styrene, α-alkylstyrene and vinyltoluene.

Components (a1), optionally (a2) and optionally (a3) are mixed, if desired in a suitable organic solvent, and added to an organic solvent or solvent mixture where they are polymerized in the presence of at least one polymerization initiator. The organic solvents and polymerization initiators employed are those which are conventional for the preparation of polyacrylate resins and suitable for the production of aqueous dispersions. Examples of solvents which can be used are butylglycol, 2-methoxypropanol, n-butanol, methoxybutanol, n-propanol, ethylene glycol monoethyl ether, ethylene glycol monobutyl ether, diethylene glycol diethyl ether, diethylene glycol monobutyl ether and 3-methyl-3-methoxybutanol. Examples of polymerization initiators which can be used are initiators which form free radicals, for example benzyl peroxide, azobisisobutyronitrile and t-butyl perbenzoate. The polymerization is carried out at a temperature of from 80° to 160° C. and preferably from 120° to 160° C. The mixture of (a1), optionally (a2) and optionally (a3) is added over a period of from 2 to 8 hours and preferably over a period of from 3 to 6 hours to the organic solvent or solvent mixture where it is polymerized in the presence of at least one initiator which forms free radicals.

After at least 80% by weight and preferably 100% by weight of the mixture composed of (a1), optionally (a2) and optionally (a3) has been added, in stage II (b1) from 60–100% by weight of an ethylenically unsaturated monomer which carries at least one carboxyl group per molecule and is copolymerizable with (a1), (a2) and (a3), or of a mixture of such monomers, together with (b2) from 0–40% by weight of an ethylenically unsaturated monomer which is free from carboxyl groups and is copolymerizable with (a1), (a2), (a3) and (b1), or of a mixture of such monomers, are added to the mixture and polymerization is continued until the monomers added in stage (I) and (II) have undergone essentially complete reaction.

It is preferred to employ in stage (II) 100% by weight of component (b1).

As component (b1) any ethylenically unsaturated monomer which carries at least one carboxyl group per molecule and is copolymerizable with (a1), (a2) and (a3), or a mixture of such monomers, can be employed. It is preferred to employ acrylic acid and/or methacrylic acid as components (b1). However, it is also possible to employ other ethylenically unsaturated acids having up to 6 carbon atoms in the molecule. Examples of such acids are ethacrylic acid, crotonic acid, maleic acid, fumaric acid and itaconic acid.

Other possibilities for employment as component (b1) are mono(meth)acryloyloxyethyl esters of maleic, succinic and phthalic acids.

As component (b2) any ethylenically unsaturated monomer which is copolymerizable with (a1), (a2), (a3) and (b1) can be employed. All those monomers listed in the description of components (a1), (a2) and (a3) can be employed as component (b2).

Components (b1) and optionally (b2) are preferably added over a period of from 10 to 60 minutes and particularly preferably over a period of from 15 to 45 minutes.

After addition of monomers (b1) and optionally (b2) has been completed, polymerization is continued until all the monomers employed have undergone essentially complete reaction.

The nature and quantity of components (a1), (a2), (a3), (b1) and (b2) are chosen such that the reaction product has a hydroxyl number of from 0 to <40, preferably from 5 to 35, an acid number of from 20 to 100, preferably from 25 to 50, and a glass transition temperature ($T_G$) of from −40° C. to +60° C., preferably from −20° C. to +40° C.

The quantity and rate of addition of the initiator are preferably chosen so that a polyacrylate resin having a number-average molecular weight of from 2,500 to 20,000 is obtained. It is preferred to commence the addition of the initiator at the same point in time as the addition of the mixture of components (a1), (a2) and optionally (a3) and to end it approximately half an hour after the addition of component (b1) and optionally (b2) has been completed. The initiator is preferably added in a constant quantity per unit time. When the addition of the initiator is complete, the reaction mixture is held at the polymerization temperature for a sufficient time (generally about 1 ½ hours) for all the monomers employed to have undergone essentially complete reaction. "Essentially complete reaction" is intended to mean that preferably 100% by weight of the monomers employed have been reacted, but that it is also possible for a small residual monomer content of not more than up to about 0.5% by weight, based on the weight of the reaction mixture, to remain unreacted.

The polyacrylate resins (A2) are prepared by employing from 40 to 87.5% by weight, preferably from 55 to 80% by weight, of component (a1), from 0 to 45% by weight, preferably from 12 to 35% by weight, of component (a2), from 0 to 25% by weight, preferably from 8 to 18% by weight, of component (a3), from 2.5 to 15% by weight, preferably from 3 to 7% by weight, of component (b1) and from 0 to 6% by weight of component (b2), the sum of the proportions by weight of (a1), (a2), (a3), (b1) and (b2) always being 100% by weight.

The binders employed in the base colors A can also, of course, be mixtures of the binders (A1) and (A2) mentioned and, in addition, other water-dilutable or water-dispersible binders.

It is essential to the invention that the base colors A are essentially free of water and preferably completely free of water. The water content of the base colors should be less than 5% by weight, based on the total weight of base color.

As solvent, the base color contains one or more organic solvents. Examples of suitable solvents are, in particular, water-soluble or water-dilutable solvents, for example alcohols, esters, ketones, keto esters, glycol ether esters and the like. Preferably employed are alcohols and glycol ethers, particularly preferably butyl glycol and butanols.

The possibility exists here, as early as during the preparation of the binders, of employing solvents which subsequently also remain as solvents in the base color. However, it is more common to prepare the binders employing another solvent which is distilled off gently after the preparation of the binders, by vacuum distillation or thin-film evaporation, and is replaced by a solvent which remains in the binder solution which is then employed in the base color. Higherboiling solvents should be water-soluble and remain in the polyurethane resin solution which is employed in the base color so as to facilitate the coalescence of the polymer particles during film formation.

Thus, for example, the preparation of the acrylated polyurethane resin solution is carried out in a ketone, for example methyl ethyl ketone or acetone. After addition of butylglycol, solvent replacement then takes place by distillative removal of the ketone (methyl ethyl ketone, acetone). Particularly preferred as solvents for the preparation of the polyurethane resin are methoxypropyl acetate, ethoxyethyl acetate and N-methylpyrroline, which do not have to be replaced (no active hydrogen) and can remain in component A. If desired, these solvents for the preparation of the polyurethane resins can also be employed as a mixture with ketones, although the ketones do not remain in the base color but are replaced after the preparation of the polyurethane resin.

In addition, component A can also contain conventional auxiliaries and additives. Examples of such additives are antifoams, dispersion auxiliaries, emulsifiers, leveling agents, etc.

The preparation of component A is carried out by methods which are known to those skilled in the art by mixing and, if desired, dispersing the individual components. For example, the incorporation of color pigments is conventionally carried out by grinding (dispersing) the respective pigments with one or more of the binders described above, which are preferably employed in the form of their solutions in organic solvents. An optional feature is for the grinding to be accompanied by the addition of further organic solvent. The grinding of these pigments is carried out using conventional apparatus, for example bead mills and sand mills.

The incorporation of the effect pigments is conventionally carried out by homogeneous mixing of the effect pigments with one or more solvents. This mixture is then stirred, using a stirrer or dissolver, into a mixture of one or more of the binders described above, if desired with the addition of further organic solvents. The binders are preferably employed in the form of their solutions in organic solvents.

The respective quantity ratios of pigment, binder and solvent are dependent in this case, as is familiar to those skilled in the art, on the flow characteristic of the pigment paste, and are thus dependent on the particular pigment used.

A further constituent of the mixer system, which is essential to the invention, is the water-containing component B. It is conceivable to use a component B which contains only deionized water and is thus only used to adjust the processing viscosity and/or the processing fluid content of the base colors. Preferably, however, component B contains at least one rheology-controlling additive. If desired, component B can also contain other auxiliaries and additives, one or more water-dilutable or water-dispersible binders and organic solvents.

The rheology-controlling additive employed comprises crosslinked polymeric microparticles as disclosed, for example, in EP-A-38127, and/or other conventional rheological additives. A thickening effect is achieved, for example, by inorganic phyllosilicates, for example aluminum/magnesium silicates, sodium/magnesium phyllosilicates and sodium/magnesium/fluorine/lithium phyllosilicates of the montmorillonite type and synthetic polymers having ionic groups and/or groups which have an associated effect, such as polyvinyl alcohol, poly(meth)acrylamide, poly(meth)acrylic acid, polyvinylpyrrolidone, styrene/maleic anhydride or ethylene/maleic anhydride copolymers and their derivatives, or else hydrophobically modified ethoxylated urethanes or polyacrylates. Inorganic phyllosilicates are preferably employed as thickeners. Particularly preferred is a combination of carboxyl group-containing polyacrylate copolymer having an acid number of from 60 to 780, preferably from 200 to 500, mg of KOH/g and a sodium/magnesium phyllosilicate.

The sodium/magnesium phyllosilicate is preferably employed in the form of an aqueous paste. Particularly preferred pastes contain either 3% by weight of phyllosilicate and 3% by weight of polypropylene glycol or 2% by weight of phyllosilicate and 0.6% by weight of polypropylene glycol or 2% by weight of phyllosilicate and 2% by weight of other commercial surface-active substances, all the percentages being based on the total weight of the paste. These aqueous pastes of the thickening agent should only be added to component B and not to component A.

Suitable for use in component B are the water-dilutable or water-dispersible polyacrylate resins and acrylic polyurethane resins which have already been listed in the description of component A, and, furthermore, other water-dilutable or water-dispersible polyurethane resins and other polyacrylate, polyester and amino resins. For use in component B, these binders can be employed not only as an organic solution but also, preferably, in a form in which they contain water. This transfer of the resins to the aqueous phase is preferably carried out by neutralizing the carrier groups (groups capable of forming anions or cations, such as, for example, carboxyl groups) followed by dilution with water, having already, if desired, partially removed the organic solvent employed in the preparation of the resin, or by direct synthesis of the resin in the presence of water. For further details reference is made to the literature in which the preparation of the resins is described (cf. e.g. DE-A-3210051, DE-A-2624442, DE-A-3739332, U.S. Pat. No. 4,719,132, EP-A-89497, U.S. Pat. No. 4,558,090, U.S. Pat. No. 4,489,135, EP-A-38127, DE-A-3628124, EP-A-158099, DE-A-2926584, EP-A-195931 and DE-A-3321180).

Further suitable binders for component B include water-dilutable or water-dispersible polyurethane resins which cannot be prepared in the form of organic solutions. These are, in particular, polyurethane resins in which the NCO-containing prepolymer was reacted with a polyamine as the modifying agent.

The preparation of these polyurethane resins is usually carried out so as, initially, to make an NCO prepolymer dilutable or dispersible in water. For this purpose, for example, at least some of the anionic groups of the NCO prepolymer are neutralized using a tertiary amine.

The increase in water-dispersibility accomplished by this means is sufficient to enable infinite dilution. It is also sufficient to make a stable dispersion from the neutralized polyurethane. The remaining isocyanate groups are reacted with the modifying agent. This reaction leads to further linking and an increase in the molecular weight. The preferred modifying agents are water-soluble compounds, because they increase the dispersibility of the polymeric end product in water. Organic diamines are suitable because in general they build up the highest molecular mass without the resin gelling. A prerequisite for this is, however, that the prepolymer is present as a dispersion in water or in some other adequately diluted form prior to the chain extension. The amount of modifying agent depends on its functionality and on the NCO content of the prepolymer.

The presence of excess active hydrogen, in particular in the form of primary amine groups, can lead to polymers having undesirably low molecular masses. The chain extension can be carried out at least partially using a polyamine which has at least three amino groups containing a reactive hydrogen. This type of polyamine can be employed in an amount such that, after the extension of the polymer, unreacted amine nitrogen atoms are present having 1 or 2 reactive hydrogen atoms. Such polyamines which can be used are diethylenetriamine, triethylenetetramine, dipropylenetriamine and dibutylenetriamine. Preferred polyamines are the alkyl- or cycloalkyltriamines, such as diethylenetriamine. In order to prevent gelling during the extension of the chains, small proportions of manoamines [sic], such as ethylhexylamine, can also be added. Further suitable water-dilutable or water-dispersible binders for component B include the water-dilutable emulsion polymers described in DE-A-3841540. These emulsion polymers can be obtained by a) in a first stage, polymerizing from 10 to 90 parts by weight of an ethylenically unsaturated monomer or of a mixture of ethylenically unsaturated monomers in the aqueous phase in the presence of one or more emulsifiers and one or more free-radical initiators, the ethylenically unsaturated monomer or the mixture of ethylenically unsaturated monomers being selected such that, in the first stage, a polymer having a glass transition temperature ($T_{G1}$) of from +30° to +110° C. is obtained, and, b) after at least 80% by weight of the ethylenically unsaturated monomer or monomer mixture employed in the first stage have been reacted, polymerizing in a second stage from 90 to 10 parts by weight of an ethylenically unsaturated monomer or of a mixture of ethylenically unsaturated monomers in the presence of the polymer obtained in the first stage, the monomer employed in the second stage or the mixture of ethylenically unsaturated monomers employed in the second stage being selected such that the homopolymerization of the monomer employed in the second stage or of the mixture of ethylenically unsaturated monomers employed in the second stage would lead to a polymer having a glass transition temperature ($T_{G2}$) of from −60° to +20° C., and the reaction conditions being chosen such that the resulting emulsion polymer has a number-average molecular mass of from 200,000 to 2,000,000 and the ethylenically unsaturated monomer or monomer mixture employed in the first stage and the ethylenically unsaturated monomer or monomer mixture employed in the second stage being selected in terms of their nature and quantity such that the resulting emulsion polymer has a hydroxyl number of from 2 to 100 mg of KOH/g, preferably from 10 to 50 mg of KOH/g, and the difference $T_{G1}-T_{G2}$ being from 10° to 170° C., preferably from 80° to 150° C.

The water-dilutable emulsion polymers employed can be prepared by a two-stage emulsion polymerization in an aqueous medium in the known apparatus according to the known processes.

With regard to further details, reference is made to DE-A-38 41 540.

Component B can optionally, in addition, also contain one or more organic solvents, and optionally also further conventional auxiliaries and additives. Examples of suitable organic solvents are the solvents already listed in the description of component A. The content of organic solvent is usually from 0 to 3% by weight, based on the total weight of component B. Examples of suitable auxiliaries and additives are, likewise, the additives mentioned in the description of component A. The quantity employed of these additives is usually from 0 to 10% by weight, based on the total weight of component B.

If component B contains binders, the binders employed are preferably water-dilutable or water-dispersible polyurethane resins and/or amino resins or polyacrylate resins.

The mixer system according to the invention for the production of aqueous coating compositions having a precisely defined color shade comprises various pigment-containing base colors (component A) and at least one water-containing component B. Depending on the desired color of the aqueous coating composition, one or more base colors of the mixer system are then, to produce the aqueous coating composition, mixed with at least one water-containing component B directly before the application of the aqueous coating composition. Typical mixer systems comprise from 15 to 60, preferably from 20 to 40, different base colors and from 1 to 5, preferably from 1 to 3, different components B. With regard to the description of conventional mixing machines for the stocking and storage of the base colors and mixtures, reference is made merely to the literature, for example the Glasurit-Handbook, 11th Edition, Kurt R., Vincentz-Verlag, Hanover 1984, pages 544 to 547.

Preferred mixer systems according to the invention are obtained when the base colors employed as component A contain Aa) from 0.5 to 70% by weight of at least one effect pigment and/or at least one color pigment, Ab) from 10 to 80% by weight of at least one water-dilutable or water-dispersible binder, and Ac) at least one organic solvent, the sum of the proportions by weight of components Aa to Ac being in each case 100% by weight.

In addition, the base colors can also contain from 0 to 10% by weight, based on the total weight of component A, of conventional auxiliaries and additives. The mixer system is particularly preferably constructed from base colors which contain only effect pigments and base colors which contain only color pigments.

Particularly preferred base colors (component A) which are based on effect pigments contain Aa) from 0.5 to 50% by weight of at least one effect pigment, Ab) from 20 to 80% by weight of at least one water-dilutable or water-dispersible binder, and Ac) at least one organic solvent, the sum of the proportions by weight of components Aa to Ac being in each case 100% by weight.

Particularly preferred base colors (component A) which are based on inorganic color pigments contain Aa) from 1 to 70% by weight of at least one inorganic color pigment, Ab) from 10 to 80% by weight of at least one water-dilutable or water-dispersible binder, and Ac) at least one organic solvent, the sum of the proportions by weight of components Aa to Ac being in each case 100% by weight.

Particularly preferred base colors (component A) which are based on organic color pigments contain Aa) from 1 to 30% by weight of at least one organic color pigment, Ab) from 10 to 80% by weight of at least one water-dilutable or water-dispersible binder and Ac) at least one organic solvent, the sum of the proportions by weight of components Aa to Ac being in each case 100% by weight.

It is of course also possible for the base colors employed as component A to contain a combination of at least one organic color pigment and at least one inorganic color pigment. Component B preferably involves employing mixtures containing Ba) from 60 to 100% by weight, preferably from 80 to 97% by weight, of water, Bb) from 0 to 10% by weight, preferably from 2 to 5% by weight, of at least one rheology-controlling additive, this quantity being based on the weight of the pure additive excluding its solvent content, and Bc) optionally at least one water-dilutable or water-dispersible binder, the sum of the proportions by weight of components Ba to Bc being in each case 100% by weight.

The various base colors A are mixed, to produce the aqueous coating compositions, in a ratio such that the desired color results. The mixing ratio of component A with component B, or with the various components B, is determined by the requirement that the resulting coating composition should have, independently of the color, the desired viscosity, the desired solids content and the desired content of organic solvents, etc.

The solids content (amount of solid binder employed plus amount of pigment employed) and the content of organic solvent vary, inter alia, depending on the intended use of the aqueous coating compositions. In the area of automotive refinishes, the solids content for metallic paints is preferably from 7 to 25% by weight and for solid-color paints is preferably from 10 to 45% by weight, in each case based on the total weight of the aqueous coating compositions.

A preferred embodiment of the mixer system according to the invention is one in which all the base colors contain the same binder or, in the case of a binder mixture, the same binders. It is particularly preferred for all the base colors of the mixer system to have the same ratio of the quantity of solid binder used (i.e. without solvent) to the amount of organic solvent which is employed. This ensures that—independently of the desired color and thus independently of the mixing ratio of the various base colors—the resulting mixture of the various base colors always has the same binder:solvent ratio and consequently, irrespective of the color, has an approximately uniform evaporation behavior (drying) and a similar rheology. This constant binder:solvent ratio in all the base colors also ensures that, if appropriate, the ratio binder (dissolved):binder (dispersed) in the finished aqueous paint is constant, to the extent that component B contains binders.

The use of different base colors having in each case an identical binder:solvent ratio has the practical advantage that irrespective of the particular color desired, constant film properties can be achieved.

If a mixture of different binders is employed in each of the base colors, then the mixing ratio of the different binders with one another in the individual base colors should preferably also be constant in each case, so that, after mixing with component B, constant mixing ratios are again obtained with respect to the binders irrespective of the color. If in component B a mixture is employed of the binders which are also used in component A, then the mixing ratio of the different binders in component B with one another should also preferably be the same as the mixing ratio of these binders in component A.

Particularly preferred mixer systems are obtained when the binder contained in component B comprises polyurethane resin dispersions.

The aqueous coating compositions produced using the mixer system according to the invention can be applied to a wide variety of substrates, for example metal, wood, plastic or paper. If the aqueous coating compositions prepared using the mixer system according to the invention are to be applied to plastic, then it is preferred for both base colors A and component B to contain no amino resin.

The aqueous coating compositions prepared using the mixer system according to the invention are also suitable, for example, for the production-line finishing of automobiles.

In particular, the aqueous coating compositions prepared using the mixer system according to the invention are suitable for the refinishing of damaged areas, in particular for automotive refinishing. In this case, the coating compositions are applied directly after their production by mixing components A and B to the damaged area which has been appropriately prepared (e.g. by surfacing and filtering) by conventional methods, especially spraying. The aqueous coating compositions prepared using the mixer system according to the invention are preferably employed for the production of a basecoat.

After initial drying of the basecoat thus produced at room temperature or by forced drying (e.g. 10 min at 60° C., 80° C. or IR drying), a suitable transparent topcoat composition is applied. Suitable topcoats are 1- or 2-component clearcoats in aqueous form or as organic solutions, and powder clearcoats. 2-component clearcoats based on a hydroxyl group-containing acrylate copolymer and a polyisocyanate are frequently employed. Such clearcoats are described in, for example, Patent Applications DE 34 12 534, DE 36 09 519, DE 37 31 652 and DE 38 23 005. Suitable 1-component clearcoats, based for example on a binder containing hydroxyl groups and on an amino resin curing agent, are likewise known and are described in, for example, Kittel, Lehrbuch der Lacke and Beschichtungen [Textbook of Paints and Coatings], Volume IV; Verlag W. A. Colomb in H. Heeremann GmbH, Berlin-Oberschwandorf 1976. Also suitable are, of course, all the other clearcoats not explicitly mentioned here.

After a flash-off time of about 5 minutes which may be necessary, the basecoat is then dried together with the topcoat. When using 2-component clearcoats the drying is generally carried out at below 100° C., preferably below 80° C. The dry-film thicknesses of the basecoat are in general between 5 and 25 $\mu$m and those of the topcoat in general between 30 and 70 $\mu$m.

When using 1-component clearcoats, the basecoat is dried together with the topcoat at elevated temperatures, for example about 120° C. The dry-film thicknesses of the topcoat are in this case in general between 30 and 50 $\mu$m.

The invention is described in more detail below with reference to illustration examples. All parts and percentages are by weight, unless expressly stated otherwise.

Preparation of the polyacrylate resin solutions I and II for component A 471.5 g of Solvenon PM are initially charged to a polymerization vessel and heated to 110° C. Commencing simultaneously, 1424.5 g of the respective monomer mixtures 1 and 2 given below are added over a period of 4 h, and a mixture of 90 g of tert-butyl peroxyethylhexanoate and 210 g of Solvenon PM are added over a period of 4.5 h at the reaction temperature of 110° C. After a metering period of 3.5 h, a third feed comprising a mixture of 142.5 g of monomer mixture 1 or 2 and 75 g of acrylic acid are added uniformly over a period of 1 h. When the feeds are exhausted, the reaction mixture is held at 110° C. for a further 1 h.

Monomer mixture 1:
- 300 g of n-butyl methacrylate
- 300 g of methyl methacrylate
- 225 g of styrene
- 150 g of lauryl methacrylate
- 337 g of tert-butyl acrylate
- 112.5 g of hydroxyethyl methacrylate Monomer mixture 2:
- 300 g of n-butyl methacrylate
- 300 g of methyl methacrylate
- 225 g of styrene
- 150 g of lauryl methacrylate
- 450 g of tert-butyl acrylate

| Polyacrylate solution | I | II |
|---|---|---|
| OH number | 32 | 0 |
| Solids content | 69.1% | 68.3% |

Preparation of the polyurethane resin dispersion III for component A (comparison)

819.9 g of a dimeric technical-grade C18 fatty acid (Pripol 101 from Unichema), 269.3 g of 1,6-hexanediol, 331.5 g of isophthalic acid, 236.6 g of neopentylglycol and 58.6 g of xylene are melted in a vessel fitted with a stirrer, a thermometer and a packed column. The temperature is then raised, while stirring and under nitrogen, so that the temperature at the head of the column does not exceed 140° C. At a maximum temperature of the reaction mixture of 220° C., the mixture is subjected to further condensation until an acid number of 5 is reached. The temperature is lowered to 160° C. and a vacuum of 100 mbar is applied for 0.5 h. An acid number of between 3 and 4 is attained. The polyester obtained is cooled to 80° C. and diluted with methyl ethyl ketone to a solids content of 73%. 283.0 g of m-tetramethylxylene diisocyanate (tradename TMXD, from the American Cyanamid Company), 264.0 g of methyl ethyl ketone, 56.1 g of dimethylolpropionic acid, 9.2 g of neopentylglycol and 882.8 g of the polyester solution described above are weighed out together and charged into a steel vessel suitable for polyurethane reactions having a reflux condenser, thermometer and stirrer, where they are heated to 82° C. When an NCO value of the solution of 1.1 has been reached, 52.0 g of trimethylolpropane are metered in. The reaction is carried out up to an NCO value <0.1. Then 637 g of butylglycol are added and a butylglycol/methyl ethyl ketone mixture is distilled off under vacuum until the mixture going over has a refractive index of 1.4175. Subsequently, 34.4 g of N,N-dimethylethanolamine are metered in at 82° C., and the mixture is stirred for a further 30 min. Finally, the batch is adjusted to a solids content of 60% with butylglycol.

Preparation of a polyurethane resin dispersion B1 for component B 686.3 g of a polyester having a number-average molecular weight of 1400 based on a commercial unsaturated dimeric fatty acid (having an iodine number of 10 mg of $I_2$/g, a monomer content of not more than 0.1%, a trimer content of not more than 2%, an acid number of from 195 to 200 mg of KOH/g and a saponification number of from 197 to 202 mg of KOH/g, isophthalic acid and hexanediol are charged under inert gas to a suitable reaction vessel having a stirrer, reflux condenser and feed vessel, and admixed successively with 10.8 g of hexanediol, 55.9 g of dimethylolpropionic acid, 344.9 g of methyl ethyl ketone and 303.6 [lacuna] of 4,4'-di(isocyanatocyclohexyl) methane. This mixture is heated under reflux until the isocyanate content has fallen to 1.0%. 26.7 g of trimethylolpropane are then added to the mixture and it is held under reflux until a viscosity of 12 dPas is reached (=resin solution dissolved 1:1 in N-methylpyrrolidone). The addition of 47.7 g of butylglycol destroys any excess isocyanate which may be present. 32.7 g of dimethylethanolamine, 2,688.3 g of deionized water and 193.0 g of butylglycol are then added to the reaction mixture with vigorous stirring. After removing the methyl ethyl ketone by vacuum distillation a dispersion having a solids content of about 27% is obtained.

2. Preparation of various base colors

Preparation of base color A1

10 parts of Chromophthal Red, 38 parts of Dowanol PnB and 51 parts of polyacrylate resin solution I neutralized with dimethylethanolamine (49 parts of I; 2 parts of dimethylolethanolamine) are mixed with stirring and dispersed in a laboratory bead mill.

Preparation of base color A2

10 parts of Chromophthal Red, 38.4 parts of Dowanol PnB and 51.6 parts of the neutralized polyacrylate resin solution II (49.6 parts of II, 2.0 parts of dimethylethanolamine) are mixed with stirring and dispersed in a laboratory bead mill.

Preparation of base color V1 for comparison 10 parts of Chromophthal Red, 33.5 parts of Dowanol PnB and 56.5 parts of the neutralized polyurethane resin dispersion III are mixed with stirring and dispersed in a laboratory bead mill.

Preparation of the pigment-free component B 43 parts of a preswollen aqueous paste containing 3% by weight of an inorganic sodium/magnesium phyllosilicate thickening agent and 3% by weight of polypropylene glycol having a number-average molecular weight of 900, the percentages being based on the total weight of the paste, 9 parts of deionized water, 0.5 part of a commercially available antifoam and 3.5 parts of a 3.5% strength solution of a commercially available polyacrylate thickener in water are added with stirring to 44 parts of the polyurethane resin dispersion B1.

Examples 1 and 2 and Comparative Example CE1

Using base colors A1 and A2 (Examples 1 and 2) and base color V1 (CE1) and the pigment-free component B, the aqueous coating compositions of Examples 1, 2 and of Comparative Example CE1 are prepared by stirring the respective base color directly after its preparation into component B. The mixing ratio of base color to component B is in each case 1:4.

The resulting basecoats show good compatibility (no inhomogeneities, no coagulum).

The properties of the basecoats of Examples 1, 2 and CE1 are shown in the following table.

| | T[°C.] | Flow limit [Pa] | Thixotropic index [Pa/s] | Viscosity after 4 min [Pa · s] |
|---|---|---|---|---|
| Example 1 | 20 | 1.115 | 355.9 | 0.6752 |
| Example 2 | 20 | 0.6200 | 677.0 | 0.4823 |
| CE1 | 20 | 7.498 | 373.1 | 1.241 |

We claim:

1. A mixer system for the production of water-thinnable coating compositions having precisely defined color shades, wherein the mixer system comprises Component (A) which is various base colors of precise colors that permit reproducible color matching, wherein each base color contains less than 5% by weight of water, pigment selected from the group consisting of color pigments, special effect pigments, and mixtures thereof; organic solvent, and at least one water-dilutable or water-dispersible binder comprising a resin selected from the group consisting of water-dilutable or water-dispersible polyacrylate resins, and mixtures thereof, and B) at least one pigment-free component which contains water, wherein the polyacrylate resin is obtained by adding and polymerizing, (I) a first mixture of
- a1) up to 87.5% of an acrylate or methacrylate which is copolymerizable with (a2), (a3), (b1) and (b2) and is essentially free from carboxyl groups, or a mixture of such (meth)acrylates, and
- (a2) up to 45 % by weight of an ethylenically unsaturated monomer which is copolymerizable with (a1), (a3), (b1) and (b2) and which carries at least one hydroxyl group per molecule and is essentially free from carboxyl groups, or a mixture of such monomers and
- (a3) up to 25 % by weight of an ethylenically unsaturated monomer which is copolymerizable with (a1), (a2), (b1) and (b2) and is essentially free from carboxyl groups, or a mixture of such monomers, to an organic solvent or solvent mixture, and polymerizing the mixture in the presence of at least one polymerization initiator, and after at least 80% by weight of the first mixture has been added and polymerized, adding thereto (II) a second mixture of
- (b1) from 2.5 to 15% by weight of an ethylenically unsaturated monomer which is copolymerizable with (a1), (a2) and (a3) and carries at least one carboxyl group per molecule, or a mixture of such monomers, together with
- (b2) from 0 to 6% by weight of an ethylenically unsaturated monomer which is copolymerizable with (a1), (a2), (a3) and (b1) and is free from carboxyl groups, or a mixture of such monomers, and continuing polymerization, the sum of the proportions by weight of (a1), (a2), (a3), (b1) and (b2) always being 100% by weight, wherein the polyacrylate resin has a hydroxyl number of from 0 to <40, an acid number of from 20 to 100, and a glass transition temperature ($T_G$) of from −40° C. to +60° C., wherein components A and B are stored separately.

2. A mixer system according to claim 1, wherein the various base colors A are free of water.

3. A mixer system according to claim 1, wherein component B contains at least one rheology-controlling additive.

4. A mixer system according to claim 1, wherein component B contains as binder at least one resin selected from group consisting of polyurethane resins, amino resins, polyacrylate resins, and mixtures thereof.

5. A mixer system according to claim 1, wherein the various base colors A each contain from 0.5 to 70% by weight of at least one pigment selected from the group consisting of color pigments, special effect pigments, and mixtures thereof; and from 10 to 80% by weight of at least one water-dilutable or water-dispersible binder; and Ac) compounds selected from the group consisting of at least one organic solvent, additives, and mixtures thereof, the sum of the proportions by weight of components Aa to Ac being in each case 100% by weight.

6. A mixer system according to claim 1, characterized in that the mixer system contains A1) at least one base color containing effect pigments, A2) at least one base color selected from the group consisting of base colors containing inorganic color pigments, base colors containing organic color pigments and mixtures thereof.

7. A mixer system according to claim 1, wherein the various base colors A contain the same binder.

8. A mixer system according to claim 1, wherein the various base colors A have the same ratio of solid binder to organic solvent.

9. Process for the production of water-thinnable coating compositions having a precisely defined color shade, in which various base colors of a mixer system are produced and stored separately and are only mixed shortly before the application of the coating composition, comprising the step of mixing at least one base color A and at least one component B of the mixer system according to claim 1.

10. A mixer system according to claim 3, wherein component B further comprises at least one water-dilutable or water-dispersible binder.

11. Mixture system according to claim 1, wherein the various base colors A contain a binder mixture and the same binders are used in the same mixture ratio to one another.

12. Mixture system according to claim 8, wherein the ratio of solid binder to solvent in the finished aqueous composition is constant.

13. Mixter system according to claim 1, wherein the ratio of solid binder to solvent in the finished aqueous coating composition is constant.

* * * * *